Aug. 9, 1932.                J. M. COAHRAN                1,870,834
        METHOD OF EXTRACTION OR OTHER COUNTERCURRENT TREATMENT
                  Original Filed Jan. 21, 1925    3 Sheets-Sheet 1

Inventor:
Jesse M. Coahran

Aug. 9, 1932.   J. M. COAHRAN   1,870,834
METHOD OF EXTRACTION OR OTHER COUNTERCURRENT TREATMENT
Original Filed Jan. 21, 1925   3 Sheets-Sheet 2
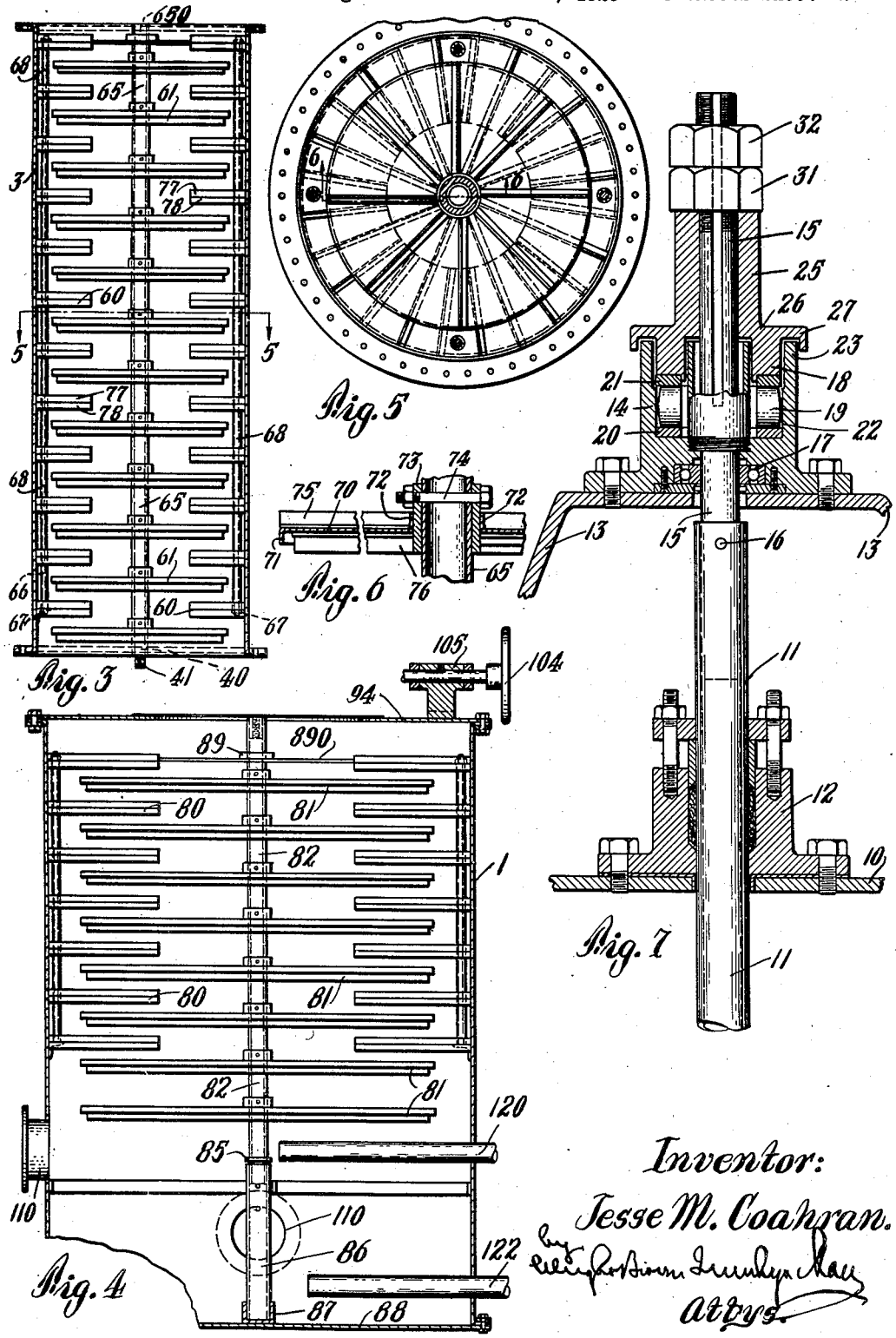
Inventor:
Jesse M. Coahran.

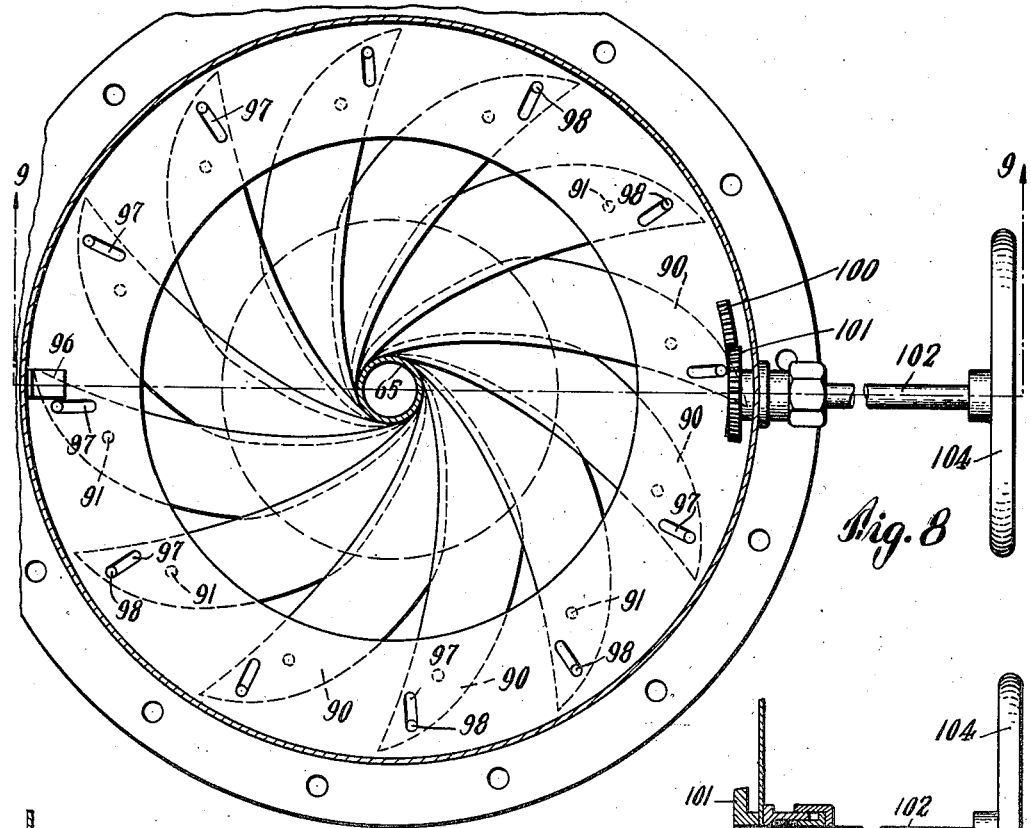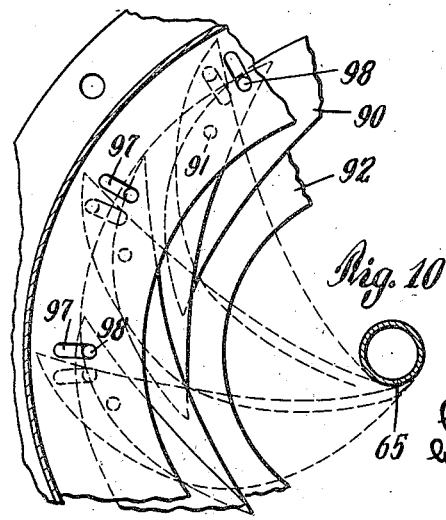

Patented Aug. 9, 1932

1,870,834

UNITED STATES PATENT OFFICE

JESSE M. COAHRAN, OF SMETHPORT, PENNSYLVANIA, ASSIGNOR TO OLEAN SALES CORPORATION, OF OLEAN, NEW YORK, A CORPORATION OF DELAWARE

METHOD OF EXTRACTION OR OTHER COUNTERCURRENT TREATMENT

Original application filed January 21, 1925, Serial No. 3,797, now Patent No. 1,845,128, dated February 16, 1932. Divided and this application filed March 16, 1927. Serial No. 175,734.

This invention relates to method of countercurrent flow treatment having been developed more particularly for the extraction of chemicals from material containing them through the use of solvents for the chemicals. The solvent is brought into intimate contact with the material containing the chemicals, whereby the material yields a portion of the chemicals to the solvent which is then removed and the chemicals recovered therefrom. In order that the largest possible proportion of chemicals shall be removed from the material it is evident that a relatively small quantity of material should be treated with a relatively large quantity of solvent, and also that for the most efficient extraction, material from which the chemicals have been more nearly removed should be treated with the fresher solvent. The use of a relatively large amount of solvent for the total amount of material treated, and consequently for the amount of chemicals recovered, would, however, result in a large amount of solvent solution weak in chemicals from which the chemicals would be recovered. This would greatly increase the difficulties and the cost of such recovery due to the great volume handled in proportion to the amount of chemicals recovered. For the most efficient recovery, therefore, it is desirable that the chemicals should be highly concentrated in the solvent. To effect this, it is clear that a relatively small amount of solvent must be used to treat a relatively large amount of material and that the solvent more nearly saturated with the chemicals should be brought into contact with material containing the greatest portion of chemicals to be extracted.

The treatment of the nearly exhausted material with the fresh solvent and the fresh material with the more nearly saturated solvent may be readily effected by establishing flow of the material and solvent in opposite directions while in contact with each other.

The treatment of a relatively small amount of material with a relatively large amount of solvent for most efficient extraction, and the treatment of a relatively small amount of solvent with a relatively large amount of material for the easiest recovery of chemicals from the solvent, however, present opposed conditions, and as heretofore practiced this general method of recovery of chemicals has been carried out as a compromise, balancing the wastage of chemicals through incomplete extraction against the saving effected by recovery from the more highly saturated solvents.

According to the present invention, however, both of these apparently inconsistent conditions are maintained in the one apparatus, and in a continuous counter flow process, a relatively large or preponderating volume of the solvent contacting with a relatively small volume of nearly extracted material, and the major portion of the extraction being effected with a large proportion of solvent to material so that the extraction may be highly efficient, and the more nearly saturated solvent being thereafter brought into intimate contact with a relatively large or preponderating volume of substantially untreated material in order that the concentration in the solvent at the end of the treatment shall be high, thus requiring the minimum amount of treatment for recovery of the chemicals from the solvent.

In my Patent No. 1,845,128 granted February 16, 1932, for apparatus for extracting chemicals from liquors is disclosed and claimed an apparatus for carrying out the method therein claimed as applied to extraction of chemicals from liquids, the present application covering matter divided out from that application. This method is not limited to extraction from liquids but may be used also to extract from solids or any fluent material of such a nature as to be easily separated from the solvent and in its broadest aspects may be found applicable to any countercurrent flow treatment. An apparatus intended for extraction from fluent solid material according to the method of this invention is disclosed and claimed in my Patent No. 1,793,465 granted February 24, 1931, for method and apparatus for leaching.

Where the material to be extracted is of different specific gravity from the solvent, advantage may be taken of this difference in specific gravity to cause automatic separation of the solvent from the material after the treating operation. For the purpose of the present invention the apparatus shown and claimed in my Patent No. 1,845,128 alone is illustrated, though claims generic to the method as applied to any countercurrent treatment or to any material to be extracted as well as specific to the extraction from liquids are included herein.

For a more complete understanding of this invention, reference may be had to the accompanying drawings in which one embodiment of an apparatus capable of carrying out the improved process as applied to extraction of chemicals from liquors is set forth. While the invention will be described with more particular reference to extraction of chemicals from liquors more particularly the extraction of acetic acid from pyroligneous acid liquor, it should be understood that in its broader aspects it is not limited to such use, but is applicable to treatment of any material with a treating agent to produce a physical interchange therebetween where the material and agent may be caused to move in countercurrent flow and where the material and agent may be readily separated after the treatment has been effected. It should be evident, however, that the process might be carried out in other apparatus differing in many respects from that illustrated.

Referring to the accompanying drawings:

Figure 3 is a vertical cross section through one of the intermediate sections.

Figure 4 is a vertical cross section through the lowest section.

Figure 5 is a horizontal cross section on line 5—5 of Figure 3.

Figure 6 is a detail section on line 6—6 of Figure 5.

Figure 7 is a detail section to an enlarged scale of the upper shaft bearing and related parts.

Figure 8 is a section on either of the lines 8—8 of Figure 1.

Figure 9 is a section on line 9—9 of Figure 8.

Figure 10 is a fragmentary view similar to a portion of Figure 8, but showing the parts in different positions.

Figures 1, 2:
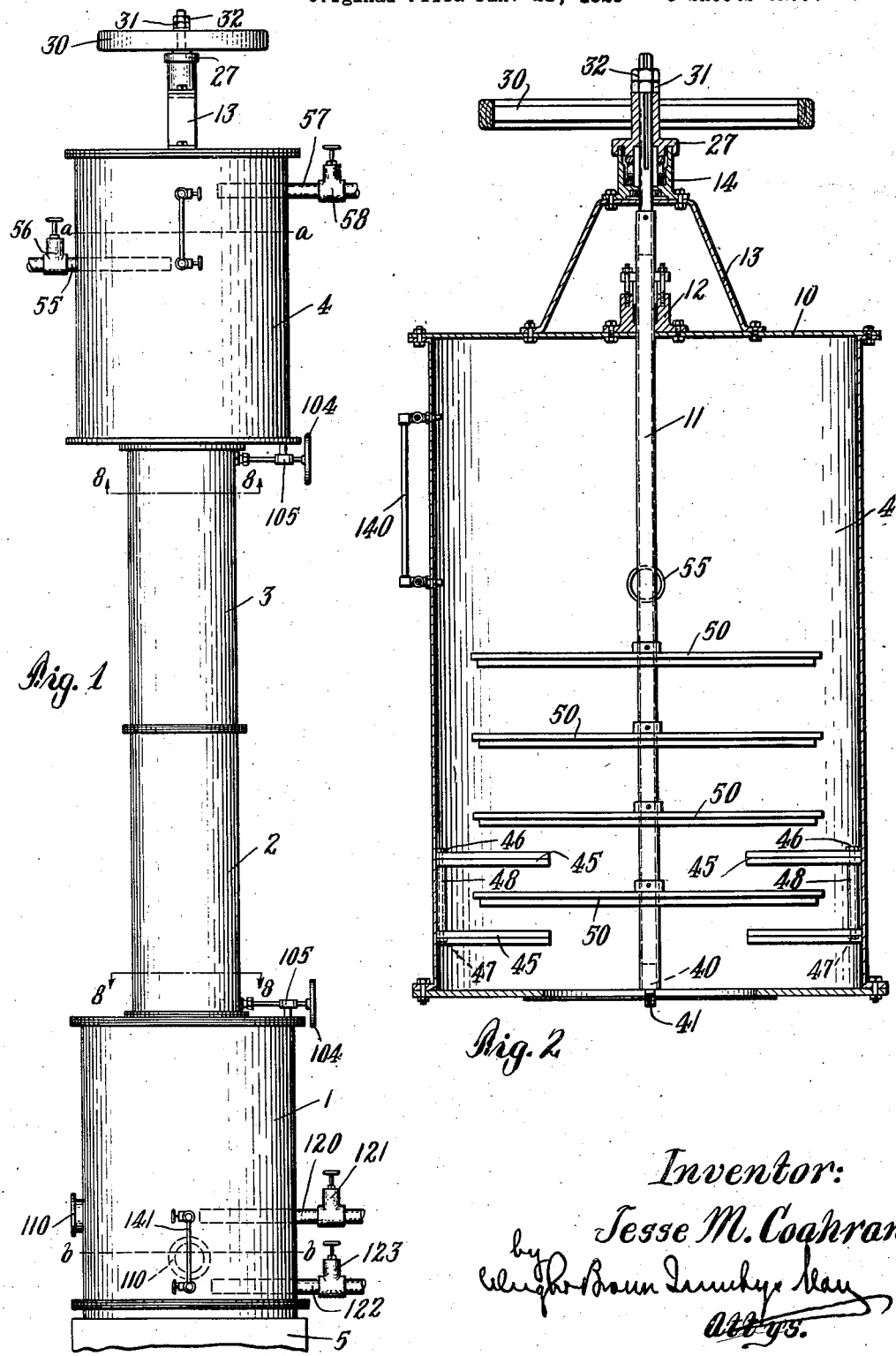
Figure 1 is a side elevation of the extractor.
Figure 2 is a vertical cross section through an upper section thereof.

Referring to Figure 1, it will be seen that the extractor comprises a plurality of superposed sections forming together a column in which the solvent and the liquor are brought into intimate contact while flowing in opposite directions. As shown, this column comprises four sections although more or less might be employed to suit the particular conditions in any given case. As shown, however, there is a lower section 1, a pair of intermediate sections 2 and 3 and an upper section 4, these sections being arranged in superposed relation and supported in vertical position on a suitable foundation 5. These column sections should, of course, be made of material which is not deleteriously affected by the liquor or saturant employed, or should be lined with some material having this characteristic.

Referring more particularly to Figures 2 and 7, it will be noted that the upper section 4 is closed off at its upper end by means of a top plate 10, through the center of which passes the section 11 of a shaft axially arranged in the column; this shaft 11 extending through a stuffing box 12. At 13 is shown an inverted U shaped bracket for supporting above the plate 10 a thrust bearing 14 which is designed to take the weight of the shaft and the parts carried thereby, as will later appear and to permit free rotation thereof. As shown best in Figure 7, the shaft section 11 is tubular and above the plate 10 it has inserted therein the lower end of the solid shaft section 15 pinned thereto by a transverse pin 16. This shaft section 15 extends through a ball-bearing 17, and above this ball-bearing it is keyed within a sleeve 18 which carries a plurality of rollers 19 engaging between hardened disks 20 and 21 seated within a counterbored portion 22 of the bearing member 23. A sleeve 25 having an outwardly extending flange 26 terminating in a downwardly extending skirt 27, is fixed to the shaft section 15 above the bearing 14, the skirt 27 enclosing the upper end of this bearing member 23. To this sleeve 25 is fixed any suitable means for rotating the shaft, as shown a belt pulley 30 being used for this purpose. The axial position of the shaft through this thrust bearing may be adjusted by means of a nut 31 threaded on the shaft section 15 above the sleeve 25 and a check-nut 32 positioned thereabove may be used in order to lock the nut 31 in adjusted position.

The shaft section 11 extends through the column section 4 and at its lower end is fixed therein a plug 40 having a threaded lower end 41 by which it may be attached to a shaft section in the upper intermediate section 3, as will later appear. Within the lower portion of the column section 4 is fixed in vertical spaced relation a series of flat imperforated annular baffle plates 45. As shown these baffle plates are strung upon tie-bolts or rods 46, made fast at their lower ends in circular series to an annular angle member 47 riveted or otherwise fixed to the inner face of the column section 4, the baffle plates 45 being spaced along the tie-bolts by means of spacing sleeves 48 placed therebetween. Intermediate each pair of fixed baffles 45 are rotating imperforate baffle plates 50, which are fixed in spaced relation on the shaft 11. It will be noted that the upper rotating baffle plate is positioned considerably below the top plate 10 of the column section, thus leaving a substantially unobstructed chamber above the baffles for a purpose which will later appear. Somewhat above the upper rotating baffle 50, is positioned an inlet pipe 55 provided with a valve 56, and somewhat above this pipe is positioned an outlet pipe 57 provided with a regulating valve 58. It will be noted that the inlet pipe 55 extends well into section 4, so as to discharge against the shaft section 11 in order that the fluid may be deflected thereby and be spread somewhat over the cross sectional area of the upper section 4. The outlet pipe 57 may also extend well within the section 4 as withdrawing solvent from the center of the column aids in producing symmetrical flow of liquids in the column.

Below the section 4 is an intermediate section 3 shown in detail in Figures 3, 5 and 6. Within this section and throughout substantially its entire length are alternate series of fixed baffles 60, and rotating baffles 61. The rotating baffles 61 are carried by a vertical hollow shaft 65 having at its upper end a threaded opening 650 to receive the threaded lower end 41 of the plug 40 carried by the tubular shaft section 11 by which means this section 11 may be firmly attached to the shaft section 65 so that both may rotate together. The stationary baffles 60 are carried by tie-rods 66, supported at their lower ends in an annular angle member 67 fixed to the wall of the section 3, these stationary baffles being spaced apart along the tie-rods by spacing sleeves 68 similar to the spacing sleeves 48 in the upper section 4. It will thus be seen that the mounting of the stationary baffles is the same in the two sections, but in section 3 the series of rotating and stationary baffles extend the whole length of the section, whereas in the upper section 4 they terminate well below its upper end and below the intake pipe 55.

In Figures 5 and 6, is shown in detail the manner of attaching the rotating baffles to the shafts 11 and 65 and their construction. Each of these rotary baffles comprises a substantially flat disk 70 having a downwardly turned outer stiffening margin 71, and a central perforation having an upwardly extending margin 72. This upwardly extending margin 72 is fixed to the outer face of a sleeve 73 through which the shaft section 11 or 65 passes, this sleeve 73 being fixed to the shaft by means of a transverse bolt 74 passing through mating perforations in the shaft and sleeve. Except for the central openings to receive the actuating shaft these baffles are imperforate. For a purpose which will later appear, there are provided radially extending fins 75 and 76 on the upper and lower faces of the disks 70, these fins being preferably arranged in staggered relation on their upper and lower faces. Similarly each of the stationary baffles is provided with radially extending fins 77 and 78 on its upper and lower faces, and its inner edge may be provided with a stiffening flange similar to the flange 71 of the rotary baffles. If desired, both these baffles may be cast from suitable metal with disks, fins and hubs complete.

The lower intermediate section 2 is identical with the section 3, and as above noted, there may be one or more than two such intermediate sections if desired.

The lower column section 1 is shown in detail in Figure 4. This section is somewhat similar to the upper section 4, but contains in its upper portion only a series of stationary annular baffles 80 similar in all respects to the baffles 45 in the upper section, and rotating baffles 81 similar in all respects to the baffles 50 in the upper section. The rotary baffles are fixed to a hollow shaft 82 coupled to the lower end of the shaft section 65 in the adjacent intermediate section 2 by means of a plug 40 fixed in such upper shaft section and having a threaded lower end 41 for engagement within the upper end of the shaft section 82. As shown the stationary baffles terminate substantially half way down in this section while there are two rotary baffles 81 beneath the lowest stationary baffle. As shown, the lower end of the shaft 82 terminates in a bearing socket 85 in which it may be supported during the assembly of the parts, this socket being in the upper end of a hollow post 86 which has a threaded connection at its lower end in a socket 87 fixed to the base 88 of the column section 1. Beneath the lower rotating baffle 81 in the lower section 1, is shown a supply pipe 120 provided with a control valve 121 which pipe extends well into the column section to discharge its contents against the shaft section 82 to be deflected thereby so as to reach substantially the entire cross sectional area of the column. Beneath this inlet pipe is an outlet pipe 122 provided with a valve 123, this pipe extending well inside the column in the same manner as the outlet pipe 57 at the upper end of the column.

The central shaft is made up in sections as shown, in order to facilitate the assembling of the parts and during such assembly the post 86 is adjusted by screwing upwardly in the socket 87 so that its upper end is somewhat above the position which it is to take when the apparatus is in operation. The section 82 with the two lower rotary baffles 81 fixed thereon is then placed in position and the lowest stationary baffle 80 is then inserted. The next rotary baffle is fixed to the shaft 82, and then the next stationary baffle 80 is placed in position, and so on until the rotary and stationary baffles are completely assembled in the lower section. The upper stationary baffle 80 of this section is provided with a shaft bearing 89, supported by radially arranged arms 890 extending inwardly therefrom. The section having been built up in this manner, the next intermediate section 2 is placed in position, the shaft section 65 therein made fast to the shaft section 82 and the series of stationary and movable baffles in this intermediate section are placed alternately in position in the same manner as in the lower section 1. However, for a purpose which will later appear a flow regulating device such as an iris diaphragm is preferably placed toward the ends of the series of fixed and movable plates.

In the embodiment shown, these diaphragms are placed for convenience at the lower and upper ends of the lower and upper intermediate sections 2 and 3. It is not always necessary to use such flow regulating devices but they increase the facility with which the flow of the solvent and liquor may be controlled. As shown best in Figures 8, 9 and 10, each of these diaphragms comprises a series of arc-shaped plates 90, each pivoted adjacent to one end as at 91 to an annular plate 92 placed between the flanged end 93 of the intermediate section and an annular cover plate 94 forming the adjacent end wall of the adjacent end section, which sections as shown, are of larger diameter than the intermediate sections.

Against the opposite faces of each of these plates 90 is positioned an annular plate or ring 95, which is held in position with capability of rotating about its axis by means such as angle members 96 extending inwardly from the wall of the corresponding intermediate section. This ring 95 is provided with a series of inclined slots 97 in which ride pins 98 extending from the plates 90. By rotation of the ring 95 it is evident that the sections 90 will be rocked about their pivots 91 so that their inner ends are caused to approach or recede from the shaft 65, the inner ends of these sections together defining a substantially circular opening through which the shaft passes. In the position shown in Figure 1, the elements 90 are rocked into substantial contact with the shaft 65, so as to close off therewith substantially the entire cross sectional area of the intermediate column section, while in Figure 10 they are rocked about their axes 91 in position to expose a relatively large opening between their inner edges and the shaft 65. In order to rotate the ring 95, it is shown as having fixed thereto a segmental rack 100 with which meshes a gear 101 carried by a shaft 102 which extends through the wall of the column and through a stuffing box 103 and has fixed at its outer end a hand-wheel 104 by which it may be turned. If desired this shaft 102 may be supported in a bearing 105 fixed to the annular plate 94 of the adjacent column end section.

After the column has been built up in the manner described access may be had to the post 86 through handholes at 110 and the post screwed downwardly into the socket 87 so that the weight of the shaft and rotating baffles is supported entirely by the roller thrust bearing at the upper end of the column which may run in an oil bath so that free running of the shaft may be insured.

For a more complete understanding of this invention it will be described in connection with the recovery of acetic acid from pyroligneous acid liquor, though it should be understood that neither the method nor the apparatus is limited to the recovery of any particular chemicals. A solvent which is particularly suitable for use in the recovery of acetic acid is ether, which is immiscible with pyroligneous acid liquor and is of less specific gravity. The fresh liquor to be extracted, which has preferably been treated previously to remove therefrom the tar and methanol, is flowed into the upper section 4 of the column through the pipe 55 and is maintained at a level therein between this pipe and outlet pipe 57 hereinbefore referred to by proper adjustment of the valves in these pipes. The position of the level of this liquid may be readily ascertained, for this purpose a gage-glass 140 being shown extending vertically between the levels of these two pipes in the upper column section 4. The upper portion of this column section forms a substantially unobstructed chamber so that there is a body or pool of considerable volume of acid liquor maintained therein from which a portion passes through the restricted passage between the rotating and stationary baffles in a tortuous zigzag course down through the lower portion of the column section 4, the sections 3 and 2, and the upper portion of column section 1. The ether is passed through the pipe 120 into the lower column section 1 beneath the baffles, and since the lower portion of this lower section is substantially unobstructed it forms a body or pool of considerable volume therein. From this pool the ether passes upwardly about the alternate stationary and rotating baffles in zigzag course contacting with the downwardly flowing acid liquor. As it is of less specific gravity than the acid liquor, the acid liquor passes downwardly and the ether upwardly until the ether passes above the uppermost baffles in column section 4. It then passes through the relatively large body or pool of acid liquor which has just been introduced through the pipe 55 and is the most highly concentrated liquor, and the flow of ether up through this pool is relatively slow, so that a relatively small quantity of ether having a considerable quantity of acetic acid in solution taken from the acid liquor with which it has previously been in contact passes through a relatively large volume of highly concentrated liquor so that the acid content of the ether may become as highly concentrated as possible. This ether assumes a position above the level of the body or pool of acid liquor, as at the dotted line a—a of Figure 1, and is drawn off through the pipe 57 and the acid recovered therefrom by subjecting the acid-laden ether to distillation. The acid liquor passing downwardly through the column in contact with the upwardly flowing ether parts with some of its acid to the ether so that as it reaches the lower portion of the column it becomes relatively weak in acid. At the same time the ether which is contacting therewith is progressively freer from acid so that the ether is in condition to remove acid from the acid liquor wherever the two are in contact. When the acid liquor reaches the lower portion of the lower column section 1 below the stationary baffles, it is caused to pass comparatively slowly through a relatively large volume of fresh ether introduced through the pipe 120 and which is maintained in the body or pool beneath the baffles so that nearly all the then remaining acid is removed therefrom. The liquor passing through this body or pool collects at the bottom of the column section 1, and is drawn off through the pipe 123, the level of this spent liquor being maintained between the pipes 120 and 122 substantially at the dotted line position b—b. The gage glass 141 at the lower portion of the column section 1 makes possible the determination of the level of the spent liquor which in turn defines the lower limit of the pool of fresh ether through which the nearly spent acid-liquor passes on its way to the outlet pipe 122.

The presence of the baffles insures a restricted passage between the upper pool of fresh liquor in the upper column section 4 and the lower pool of fresh ether in the lower column section 1, so that the amount of the acid passing downwardly is relatively small in proportion to the amount of ether in the lower pool, and the amount of ether passing upwardly is relatively small in proportion to the pool of fresh liquor in the upper column section 4. To further control the rate of flow of the acid-liquor downwardly, and of the ether upwardly, the diaphragms between the upper and lower and the intermediate sections have been provided, and by adjustment of these diaphragms the proportions of ether to acid-liquor in their flow through the baffled section may be adjusted. For example, if the upper diaphragm is closed more than the lower diaphragm, the fluid beneath the upper diaphragm will be largely ether, while if the lower diaphragm is more nearly closed, the fluid above it will be largely acid-liquor.

In order to increase the size of the bodies or pools of fresh liquor and fresh ether relative to their rates of flow through each other, the upper and lower column sections have been shown as of larger diameter than the intermediate sections, this to increase their cross-sectional area, although the same result might be attained to a lesser degree if all the sections were of the same diameter. Not only is the passage between the upper and lower pools restricted by the baffles, but the rates and directions of flow of fluids about these baffles is constantly changing while they are being mixed and agitated thereby; for example, as the fluids pass toward the central shaft, they flow toward the center of the column and due to the fact that the cross sectional area between the baffles is constantly decreasing as the central axis of the column is approached, the rate of flow is increased, since the same quantity of fluid flows throughout, while as the fluids pass by the inner ends of the stationary baffles they immediately flow outwardly toward the periphery of the column in reverse direction to their former flow and at constantly decreasing velocity due to the constantly increasing cross sectional area of their path. The radially extending fins 77 and 78 on the stationary baffles act to prevent the fluid from flowing toward one place on any of the stationary baffles since these fins act as partitions which insure that fluid deposited on one of the pan-like sections formed thereby must flow off the inner end of the same section, while the radiating fins on the rotating sections cause the fluid received from each pan section of the stationary baffles to be moved circumferentially by the rotation so as to be brought into contact with pan-shaped receptacles of adjacent stationary baffles angularly disposed from those from which the fluid was received by the rotary baffles. The rotary baffles in the chambers at the ends of the columns beyond the stationary baffles act as stirrers to effect an intimate mixture of the liquor and solvents in the pools. These baffles might, therefore, be formed with perforations over their surfaces distributed so as to distribute the fluid emerging from the restricted passage evenly over the cross sectional area of the pool or alternate pan sections between adjacent fins may be cut away, the cut away portions of adjacent end rotary baffles being staggered. This construction helps to mix the fluids gently so as not to disturb their gravity separations in the pools and causes them to pass in diffused condition through the pools.

There is thus an intimate mixture effected between the solvent and the chemically laden liquor not only due to the changes in velocity and direction of flow, but also to the prevention of flow currents substantially axially of the column because of the presence of the fins on the baffles which insure circulation of the two fluids spirally within the column, though the tie rods 46 and 66 offer obstruction to free circular flow, thus aiding in mixing the fluids.

It will thus be seen that the conditions for most efficient extraction comprising the treatment of nearly spent acid liquor with a relatively large volume of fresh solvent has been insured in this apparatus, and also that the conditions for the most efficient extraction of the chemicals from the solvent by reason of the treatment of a relatively small quantity of chemically laden solvent with a relatively large quantity of fresh chemical containing liquor has been effected, so that the spent liquor contains the minimum amount of unrecovered chemicals which pass to waste and the solvent is the most nearly saturated with chemicals that can be produced by the liquor of the degree of concentration treated by the apparatus. While, as shown, the treatments in the upper and lower pools are countercurrent the extracting advantage derived directly therefrom is relatively unimportant because the differences in concentration of the chemicals being extracted at the upper and lower ends of each pool is very small, the chief values of these pools residing in the volumetric ratio at which extraction is effected. The countercurrent flow in the upper and lower pools does, however, have the important function of insuring the maximum concentration of chemical to be extracted in the upper pool and the maximum strength of solvent in the lower pool throughout the entire time of extraction. The process, therefore, may be said in general to consist of a countercurrent extraction, as between the end pools, and by which the most of the extraction is effected, together with two additional extracting steps depending for their value on the volumetric relation of material and solvent during extraction with maximum purity of solvent in one instance and maximum concentration of chemical in the other, and by one of which the efficiency of extraction is increased and by the other of which the concentration of chemicals in the solvent is brought up close to its maximum. Of course either of these additional steps could be omitted in case the end attained thereby might be relatively unimportant, although both may usually be realized without any very material complications of apparatus. The countercurrent flow treatment between the extractions effected in the end pools is essentially a series of extractions each merging into the next in opposite directions through the column so that the entire process with either one or both of the pools is a successive countercurrent extraction with a progressively decreasing volumetric ratio between solvent and material as the extraction with the solvent proceeds. One such decrease is from the large pool of fresh solvent at the bottom of the column to the central countercurrent flow portion, and another such decrease is from the central countercurrent flow portion to the upper pool. The levels of the liquor and solvent in the upper and lower sections of the column may be kept at the proper point by manipulation of the valves in the supply and outlet pipes therefor, as well as by manipulation of the diaphragms by means of the hand wheels 104, and the speed of rotation of the rotary baffles may be adjusted to that point which is found most suitable for the particular fluids being treated. Where there is danger of emulsification of the liquids, of course, the rotary baffles should be rotated at such low speed that the emulsification does not take place. It has been found in practice that there appears to be no danger of emulsification occurring in the case of pyroligneous acid liquor and ether.

From the foregoing description of the method of this invention and certain apparatus by which it may be performed it should be evident to those skilled in the art that various changes and modifications might be made without departing from the spirit or scope of this invention as defined by the appended claims.

I claim:

1. The method of acting on material with a treating agent to produce a physical interchange therebetween, which comprises establishing countercurrent flow between said material and agent while maintaining a preponderating proportion of substantially fresh treating agent to act on the more completely treated material and a preponderating proportion of substantially untreated material to act on the more completely used treating agent.

2. The method of acting on material with a treating agent to produce a physical interchange therebetween, which comprises establishing continuous countercurrent flow between said material and agent while maintaining a larger volumetric ratio of treating agent to material treated toward the end of the treatment of such material than during the earlier portion of said treatment.

3. The method of extracting chemicals from material which comprises passing through and in intimate contact with said material a solvent of such chemicals in such a manner that a large proportion of fresh solvent comes into contact with material weak in chemicals and as it takes up chemicals progressively contacts with material containing a greater proportion of such chemicals and finally contacts with a relatively large proportion of material having a still greater proportion of such chemicals.

4. The method of extracting chemicals from a material by the use of a solvent for such chemicals which comprises maintaining a relatively large body of such material, maintaining a relatively large body of such solvent, and maintaining a relatively small movement of material to and through said body of solvent, and a relatively small flow of solvent through and in intimate contact with said moving material to and through said body of material, whereby the material reaching said body of solvent and relatively free from chemicals passes into intimate contact with a large volume of fresh solvent and the solvent reaching said body of material and containing chemicals passes through a large volume of substantially untreated material.

5. The method of extracting chemicals from a liquor by the use of a solvent for such chemicals immiscible with such liquor which comprises flowing such material and solvent in intimate contact with each other in opposite directions, and causing the material at the last portion of its contact with the solvent to contact with a relatively large volume of substantially fresh solvent, and causing the solvent at the last portion of its contact with the material to contact with a relatively large volume of substantially untreated material.

6. The method of extracting chemicals from a liquor which comprises passing through and in intimate contact with said liquor a solvent of such chemicals immiscible with the liquor in such a manner that a large proportion of fresh solvent comes into contact with liquor weak in chemicals and as it takes up chemicals progressively contacts with liquor containing a greater proportion of such chemicals and finally contacts with a relatively large proportion of fresh liquor.

7. The method of extracting chemicals from a liquor by the use of a solvent for such chemicals immiscible with such liquor which comprises maintaining a relatively large pool of such liquor, maintaining a relatively large pool of such solvent, and maintaining a relatively small flow of liquor to and through said pool of solvent, and a relatively small flow of solvent through and in intimate contact with said flow of liquor to and through said pool of liquor, whereby the liquor reaching said pool of solvent and relatively free from chemicals passes into intimate contact with a large body of fresh solvent and the solvent reaching said pool of liquor and containing chemicals passes through a large body of fresh liquor.

8. The method of extracting chemicals from a liquor by the use of a solvent for such chemicals immiscible with such liquor which comprises flowing such liquor and solvent in intimate contact with each other in opposite directions, and causing the liquor at the last portion of its contact with the solvent to contact with a relatively large volume of substantially fresh solvent, and causing the solvent at the last portion of its contact with the liquor to contact with a relatively large volume of substantially fresh liquor.

9. The method of extracting chemicals from liquor by means of a fluid solvent for such chemicals immiscible with the liquor and of different specific gravity which comprises maintaining in elevated position a pool of the heavier fluid, maintaining in a lower position a pool of the lighter fluid, permitting a relatively small flow of the heavier fluid from said elevated pool downwardly and down through and in intimate contact with the lighter fluid in the lower pool and drawing off the heavier fluid from beneath the lighter fluid in said lower pool, and permitting a relatively small flow of said lighter fluid upwardly in intimate contact with said flow of heavier fluid and up through and in intimate contact with the heavier fluid in said elevated pool, and drawing off said lighter fluid above the level of the heavier fluid in said elevated pool.

10. The method of extracting chemicals from liquor by means of a fluid solvent for such chemicals immiscible with the liquor and of different specific gravity which comprises maintaining in elevated position a pool of the heavier fluid, maintaining in a lower position a pool of the lighter fluid, permitting a relatively small flow of the heavier fluid from said elevated pool downwardly and down through and in intimate contact with the lighter fluid in the lower pool and drawing off the heavier fluid from beneath the lighter fluid in said lower pool, and permitting a relatively small flow of said lighter fluid upwardly in intimate contact with said flow of heavier fluid and up through and in intimate contact with the heavier fluid in said elevated pool, drawing off said lighter fluid above the level of the heavier fluid in said elevated pool, and varying the direction and velocity of flow of said contacting fluids during their flow between said pools.

11. The method of extracting acetic acid from acid containing liquor, which comprises maintaining a relatively large pool of such liquor, maintaining a relatively large pool of a solvent for acetic acid immiscible with the liquor, establishing a relatively small flow of liquor from said pool of solvent and in intimate contact therewith, and maintaining a relatively small flow of solvent from said pool of solvent and in intimate contact with and in opposite direction to said flow of liquor and then through said pool of liquor and in intimate contact therewith, drawing off the spent liquor from said pool of solvent, and drawing off the acetic acid laden solvent from said pool of liquor.

12. The method of extracting chemicals from material which comprises establishing continuous counter flow in intimate contact of material and a solvent for such chemicals in a manner to increase substantially the relative proportions of solvent to material in contact with each other as the material parts with its chemicals to such solvents.

13. The method of extracting chemicals from a liquor containing such chemicals, which comprises flowing such liquor countercurrent to a solvent for such chemicals immiscible with such liquor and of different specific gravity, agitating such liquor and solvent while in contact with each other, passing in diffused condition solvent containing extracted chemicals through a relatively larger volume of substantially fresh liquor, passing nearly extracted liquor in diffused condition through a relatively larger volume of substantially fresh solvent, permitting gravity separation of such solvent with chemicals and extracted liquor from said pools respectively, and then drawing off the solvent with its chemicals and drawing off the extracted liquor.

14. The method of extracting chemicals from material containing such chemicals, which comprises successively extracting the material with a solvent of such chemicals, using progressively decreasing volumetric ratios between solvent and material as the chemical content of such solvent increases.

15. The method of extracting chemicals from material containing such chemicals, which comprises establishing countercurrent flow between such material and a solvent of such chemicals at a predetermined volumetric ratio, and treating the extracted material after such flow to extraction by substantially fresh solvent at a substantially larger volumetric ratio of solvent to material than in said countercurrent flow.

16. The method of extracting chemicals from material containing such chemicals which comprises establishing countercurrent flow between such material and a solvent of such chemicals at a predetermined volumetric ratio of material and solvent, and thereafter extracting more of such material having a chemical concentration at least as great as the maximum in such material during such countercurrent flow with the same solvent at a substantially larger volumetric ratio of material to solvent than during such countercurrent flow.

17. The method of extracting chemicals from material containing such chemicals, which comprises establishing countercurrent flow between such material and a solvent of such chemicals at a predetermined volumetric ratio of material and solvent, and thereafter extracting more of such material with the same solvent at a substantially larger volumetric ratio of material to solvent than during such countercurrent flow, and treating the material extracted during such countercurrent flow to extraction by substantially fresh solvent at a substantially larger volumetric ratio of solvent to material than during such countercurrent flow.

In testimony whereof I have affixed my signature.

JESSE M. COAHRAN.

CERTIFICATE OF CORRECTION.

Patent No. 1,870,834.　　　　　　　　　　　　　　　　August 9, 1932.

JESSE M. COAHRAN.

It is hereby certified that the above numbered patent was erroneously issued to "Olean Sales Corporation, of Olean, New York, a corporation of Delaware", as assignee of the entire interest in said invention, whereas said patent should have been issued to the inventor, said Jesse M. Coahran, sole owner of said invention; and that the said Letters Patent should be read with this correction therein that the same may conform to the record of the case in the Patent Office.

Signed and sealed this 25th day of October, A. D. 1932.

M. J. Moore,
Acting Commissioner of Patents.

(Seal)